US012658015B2

(12) United States Patent
Koutsantonis et al.

(10) Patent No.: US 12,658,015 B2
(45) Date of Patent: Jun. 16, 2026

(54) AUTOMATED SYSTEM AND METHOD FOR FIRE DETECTION

(71) Applicant: WINGS ICT Solutions Private Company, Athens (GR)

(72) Inventors: Loizos Koutsantonis, Athens (GR); Konstantinos Almpanakis, Athens (GR); Kostas Tsagkaris, Athens (GR); Panagiotis Demestichas, Athens (GR)

(73) Assignee: WINGS ICT Solutions Private Company, Athens (GR)

( * ) Notice: Subject to any disclaimer, the term of this patent is extended or adjusted under 35 U.S.C. 154(b) by 327 days.

(21) Appl. No.: 18/379,123

(22) Filed: Oct. 11, 2023

(65) Prior Publication Data

US 2025/0118183 A1     Apr. 10, 2025

(30) Foreign Application Priority Data

Oct. 4, 2023   (GR) ............................. 20230100809

(51) Int. Cl.
*G08B 17/10*        (2006.01)
*G06V 10/70*        (2022.01)
*G06V 20/40*        (2022.01)

(52) U.S. Cl.
CPC ............. *G08B 17/10* (2013.01); *G06V 10/70* (2022.01); *G06V 20/46* (2022.01)

(58) Field of Classification Search
CPC .... G08B 17/10; G08B 17/125; G08B 29/186; G06V 10/70; G06V 20/46; G06V 10/764; G06V 20/52
USPC ....................................................... 340/628
See application file for complete search history.

(56) References Cited

U.S. PATENT DOCUMENTS

2022/0012625 A1*   1/2022   Ben-Itzhak ............ G06N 20/00
2023/0186611 A1*   6/2023   Tullberg ................. G06T 7/292
                                                          382/103
2024/0096187 A1*   3/2024   Panindre ................ G06V 20/41

OTHER PUBLICATIONS

An intelligent fire detection approach through cameras based on computer vision methods, Wu et al., (Year: 2019).*
International Preliminary Report on Patentability dated Aug. 18, 2025, International Application No. PCT/EP/2024/078003, 8 pages.
International Search Report and Written Opinion dated Dec. 10, 2024, International Application No. PCT/EP2024/078003, 17 pages.

(Continued)

*Primary Examiner* — Omar Casillashernandez
(74) *Attorney, Agent, or Firm* — Lessani Law Group, PC

(57)        ABSTRACT

This disclosure introduces an automated computer system designed to detect fire and smoke in video frames. Within this system, an object detection model is trained to recognize fire and smoke patterns. In a post-training evaluation phase, the system utilizes the model to determine an instance-level detection threshold from a validation set, which dictates the minimum confidence score required for a fire or smoke designation. In addition, a frame-level detection rule is defined, considering both the cumulative count of detected fire or smoke instances and their associated confidence scores. During inference, the system processes video frames through the model, designates detected patterns with bounding boxes, and subsequently applies the instance-level threshold and frame-level rule. When a sequence of frames fulfills a predetermined criterion, the system activates an alarm.

15 Claims, 9 Drawing Sheets

FIRE DETECTION SYSTEM

(56) References Cited

OTHER PUBLICATIONS

Wu, Hao et al., "An Intelligent Fire Detection Approach Through Cameras Based on Computer Vision Methods", Process Safety and Environmental Protection, vol. 127, May 18, 2019, pp. 245-256.
Hosseini, Ali et al., "UFS-Net: A Unified Flame and Smoke Detection Method for Early Detection of Fire in Video Surveillance Applications Using CNNs", Journal of Computational Science, vol. 61, Feb. 25, 2022, pp. 1-25.
Lee, Yeunghak et al., "False Positive Decremented Research for Fire and Smoke Detection in Surveillance Camera using Spatial and Temporal Features Based on Deep Learning", Electronics, vol. 8, No. 10, Oct. 15, 2019, pp. 1-16.
Hashemzadeh, Mahdi et al., "Smoke Detection in Video Using Convolutional Neural Networks and Efficient Spatio-Temporal Features", Applied Soft Computing, vol. 128, Aug. 13, 2022, pp. 1-20.

* cited by examiner

OVERVIEW OF THE CONTINUOUS TRAINING AND OPERATION OF AI-BASED FIRE DETECTION SYSTEM

TRAINING PIPELINE

DATA AUGMENTATION

EVALUATION FRAMEWORK

INFERENCE PIPELINE

EXAMPLE OF ROC CURVE FOR EVALUATING THE TRAINED MODEL

FRAME CROPPED INTO FOUR SUBFRAMES

AUTOMATED SYSTEM AND METHOD FOR FIRE DETECTION

RELATED APPLICATIONS

In accordance with 35 USC 119(a), this application claims priority from Greece Patent application Ser. No. 20230100809 filed with the Hellenic Industrial Property Organization (OBI) in Greece on Oct. 4, 2023.

1. FIELD OF THE INVENTION

This invention relates generally to fire detection, and, more specifically, to an automated method for detecting a fire event using a machine learning model trained to identify smoke and fire patterns in images.

2. DESCRIPTION OF THE BACKGROUND ART

Forest fires, whether human-induced or natural, are among the most devastating events, affecting ecosystems, the environment, local and global climates, wildlife, land management, air quality, and human lives. As climate change advances, the escalating temperatures and arid conditions exacerbate the likelihood of fires igniting and spreading, presenting an ever-growing global challenge.

Urban fires, predominantly resulting from human activity, profoundly impact the microclimate and public health. Beyond the physical damage, which can disrupt transportation and communication networks, these fires release carbon monoxide and carbon dioxide, heightening the risk of respiratory and cardiovascular issues for the community.

Fire management has traditionally focused on suppression. However, in the past decade, there's been a growing interest in prevention, which demands advanced technology, algorithms, and personnel, especially in vast forests and urban zones. As extreme climate conditions-such as prolonged droughts, elevated temperatures, and dry environments-become more frequent, the need for robust monitoring and alert systems to preemptively address fire outbreaks has become increasingly critical.

Monitoring wildfires in forests and urban areas remains a significant challenge. The most common strategy for fire prevention is based on human observation. During hot and dry spells when fire risk surges, the observation of rural/forest areas by humans is systematic and frequent. Other monitoring methods include the placement of visual cameras providing continuous visual inspection of the region of interest and/or sensors measuring signals related to $CO_2$ and CO concentrations.

All of these solutions have significant limitations. Relying on human experts for visual inspection demands extensive personnel to cover vast areas, making it costly and often impractical. While optical cameras offer an improved approach, they still necessitate multiple personnel to assess the myriad video streams for fire or smoke detection. Furthermore, the effectiveness of fire detection via manual video scrutiny hinges on the expertise and vigilance of the human evaluator.

Additionally, while automated fire/smoke detection systems utilizing $CO_2$ and CO sensors excel in enclosed spaces like buildings, they falter in open settings. These devices necessitate high smoke concentrations to detect fires, making them ill-suited for expansive areas like parks, forests, large structures, and urban environments.

Therefore, there is a long-felt and significant demand for an automated system and process that can further reduce the personnel required for monitoring large areas, reduce the response times and latencies, improve the overall efficiency of the remote fire detection process, and improve overall fire management strategy.

SUMMARY OF THE DISCLOSURE

This disclosure relates to a computer system for automatically detecting fire and smoke in video frames, as well as the method performed by the computer system and the computer program run by the computer system. The system employs an object detection model trained on video frames to recognize fire and smoke patterns. In certain embodiments, to heighten precision, the model is also trained to discern patterns that mimic the visual characteristics of fire and smoke, such as color, shape, and structure, but are unrelated to any fire or smoke event. Recognizing these "other" patterns enables the model to differentiate genuine fire and smoke more effectively from visually similar entities.

The model, post-training, is able to detect fire and smoke patterns within the frames and encompass the detected patterns within bounding boxes. Each bounding box is associated with a confidence score, denoting the model's level of certainty about the detected pattern.

In an evaluation phase (after the model training), the system determines an "instance-level detection threshold" using the trained model and a validation set. This threshold defines the minimum confidence score a detected pattern must achieve to be recognized as a genuine instance of fire or smoke within the frame. The overarching aim of this threshold is to refine the accuracy of individual pattern identification and reduce potential false alarms.

In addition, the system formulates a "frame-level detection rule" in the evaluation phase with the model and the validation set. This rule outlines the specific criteria that must be met for an entire frame to be classified as exhibiting smoke or fire. Such criteria take into account the cumulative count of fire or smoke instances in the frame and their corresponding confidence scores.

In the inference phase, the system processes a continuous stream of video frames and introduces them to the trained model, which then outputs bounding boxes around identified smoke and fire patterns, each box with an accompanying confidence score. For each such pattern, the system, employing the instance-level threshold, determines its legitimacy as an instance of fire or smoke. For frames that contain these detected instances, the system applies the frame-level rule to discern if the frame as a whole should be classified as exhibiting fire or smoke.

Lastly, the system incorporates a responsive alarm mechanism, primed to activate when a sequence of frames, classified as exhibiting fire or smoke, satisfies a predefined alarm threshold, signifying a fire or smoke event. In effect, this holistic method not only identifies individual instances of fire and smoke but also ascertains when a sequence of frames with individual instances of fire and smoke constitutes a fire or smoke events, ensuring timely alerts and safeguarding assets and lives.

In one embodiment, a method for automatically detecting fire and smoke events in video frames comprises the following steps:

training an object detection model on a training data set of video frames to identify fire and smoke patterns in said frames, wherein said model is configured to output bounding boxes around detected fire and smoke patterns within the frames, each bounding box accompanied by a confidence score;

after said training, determining an instance-level detection threshold using the trained object detection model and a validation set of annotated video frames, the threshold defining a minimum confidence score requisite for a bounding box around a smoke or fire pattern to be deemed an instance of fire or smoke within a frame;

after said training, establishing a frame-level detection rule utilizing the trained object detection model and the validation set of annotated video frames, wherein said rule delineates the conditions under which a frame that includes one or more instances of smoke or fire is classified as having smoke or fire, with such conditions factoring in both a cumulative count of fire or smoke instances within each frame and their respective cumulative confidence scores; and during an inference phase, performing the following:

inputting a stream of video frames into the trained object detection model, the model outputting bounding boxes around any detected fire and smoke patterns within the frames, each bounding box accompanied by a confidence score;

for each bounding box around a fire or smoke pattern outputted by the model, determining if the bounding box represents an instance of fire and smoke using the confidence score associated with bounding box and the instance-level detection threshold;

for each frame having an instance of fire or smoke, applying the frame-level rule to the frame, wherein a frame satisfying the frame-level rule is classified as a frame having smoke or fire; and triggering an alarm in response to a sequence of frames classified as having fire or smoke satisfying an alarm threshold.

DETAILED DESCRIPTION OF THE PREFERRED EMBODIMENTS

The present disclosure relates to an automated method, computer program, and system for early-stage fire detection and alerting based on optical cameras. The methods described herein are performed by a computer system ("the system"). The terms "image" and "frame" are used interchangeably herein.

1. System for Automated Fire Detection (General Architecture)

Figure 1:
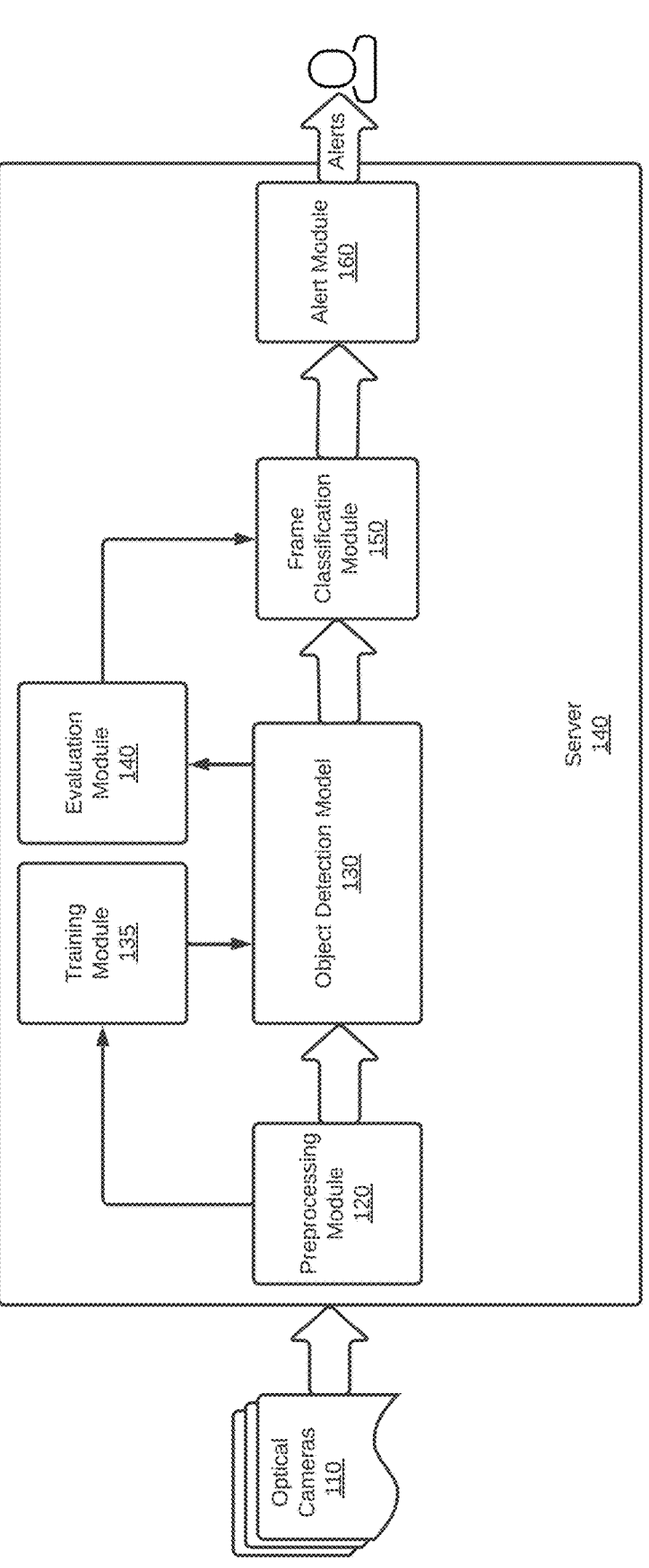
FIG. 1 is a block diagram that illustrates an example system for automated fire detection.

FIG. 1 illustrates an example system 100 for automated fire detection. Optical cameras 110 are installed and capture video from the region of interest (e.g., forest, forest-urban interface, etc.) The cameras stream high resolution image-frames of the region of interest to server 140. In the preferred embodiment, the cameras are configured to automatically rotate to cover a full angular—360°—range. The angular speed and position of the cameras can be remotely controlled. The cameras are also capable of zooming in/out to provide the maximum possible information from the region of interest. The zoom factor can also be controlled remotely following a predefined configurable pattern. This pattern is defined as a function of the camera's angular position.

A preprocessing module 120 preprocesses the video frames by (1) applying brightness and contrast correction to the frames and (2) cropping each frame into $N_{px} \times N_{py}$ (configurable) subframes.

The real-time video streams captured during the full day period feature varied light conditions inherently determined by the position of the sun and the time of the year. Moreover, the brightness of the videos captured are strongly affected by the meteorological and environmental conditions occurring at different periods (light pollution, air pollution, precipitation, clouds, etc.). As a result, the preprocessing module 120 applies brightness and contrast correction to the video frames to improve the robustness of the fire/smoke detection system. In certain embodiments, the Contrast Limited Adaptive Histogram Equalization (CLAHE) algorithm is used to normalize brightness and contrast. Other contrast/brightness normalization algorithms may be used in alternate embodiments.

Figure 9:
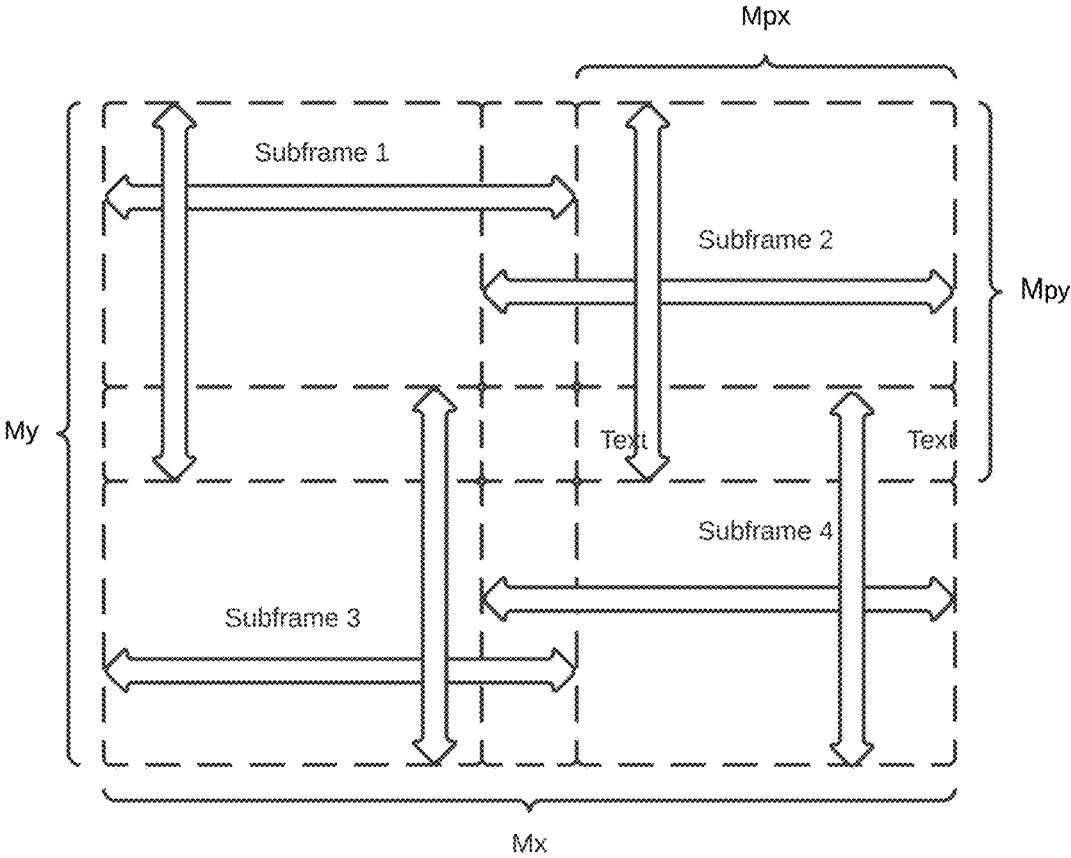
FIG. 9 is a block diagram that illustrates a frame cropped into four subframes.

Cropping frame into $N_{px} \times N_{py}$ (configurable) smaller segments and examining each segment separately enhances the precision of the detection process as the compression of the initial image is reduced (multiple segments are used at the input of the detection model). In one embodiment, the preprocessing module 120 extracts a set of $N_{px} \times N_{py}$ overlapping subframes (patches), each one having a $M_{px} \times M_{py}$ pixels size, from the initial frame having a size of $M_x \times M_y$ pixels as captured by the camera. The centers of the extracted patches are uniformly placed on the original $M_x \times M_y$ video frame ($M_{px} < M_x$ and $M_{py} < M_y$). An example of a frame cropped into four partially-overlapping subframes is illustrated in FIG. 9.

The pre-processed subframes are fed into the Object Detection Model 130, which detects any fire or smoke in the frames. The Object Detection Model 130 is an AI-based object detection model. In one embodiment, it is implemented as a deep convolutional neural network that is trained by Training Module 135 to identify the following three classes of objects in the frames:

i. class "Fire", ii. class "Smoke", and, iii. class "Other"

The "Fire" and "Smoke" classes are used for identifying patterns in the video frames which are related to fire and smoke patterns respectively. The class "Other" is used to indicate patterns which have similar visual characteristics with those of fire and smoke (color, shape, structure) but they are not related in any fire and/or smoke event. When the model identifies patterns in one of the three classes, it encompasses the pattern within a bounding box. The model assigns a score (e.g., 0.0-1.0) to each bounding box quantifying the confidence level of correctly classifying the enclosed object/pattern as one of the three classes ("Fire", "Smoke", "Other").

A Frame Classification Module 150 applies an instance-level threshold to each fire and smoke bounding box output by the Object Detection Model. This threshold defines the minimum confidence score a detected pattern must achieve to be recognized as a genuine instance of fire or smoke within a frame. The Frame Classification Model also applies a frame-level detection rule to each frame having an instance of fire or smoke within the frame. Frames satisfying the rule are classified as frames exhibiting fire or smoke. The instance-level threshold and frame-level detection rule are ascertained by a Statistical Evaluation Module 140. The processes for determining the instance-level threshold and the frame-level detection rule are described in more detail below.

The Alerting Module 160 triggers an alarm in response to a sequence of frames classified as having fire or smoke satisfying an alarm threshold. In one embodiment, the alarm notifications include the visual information (images) on the fire/smoke detected, the confidence level of the detection as calculated from the previous step, the initial time of detection, the angular range of position of the camera during the detection of the event and the positional parameters defining the location and size of the detected fire/smoke regions within the captured frames.

Figure 2:
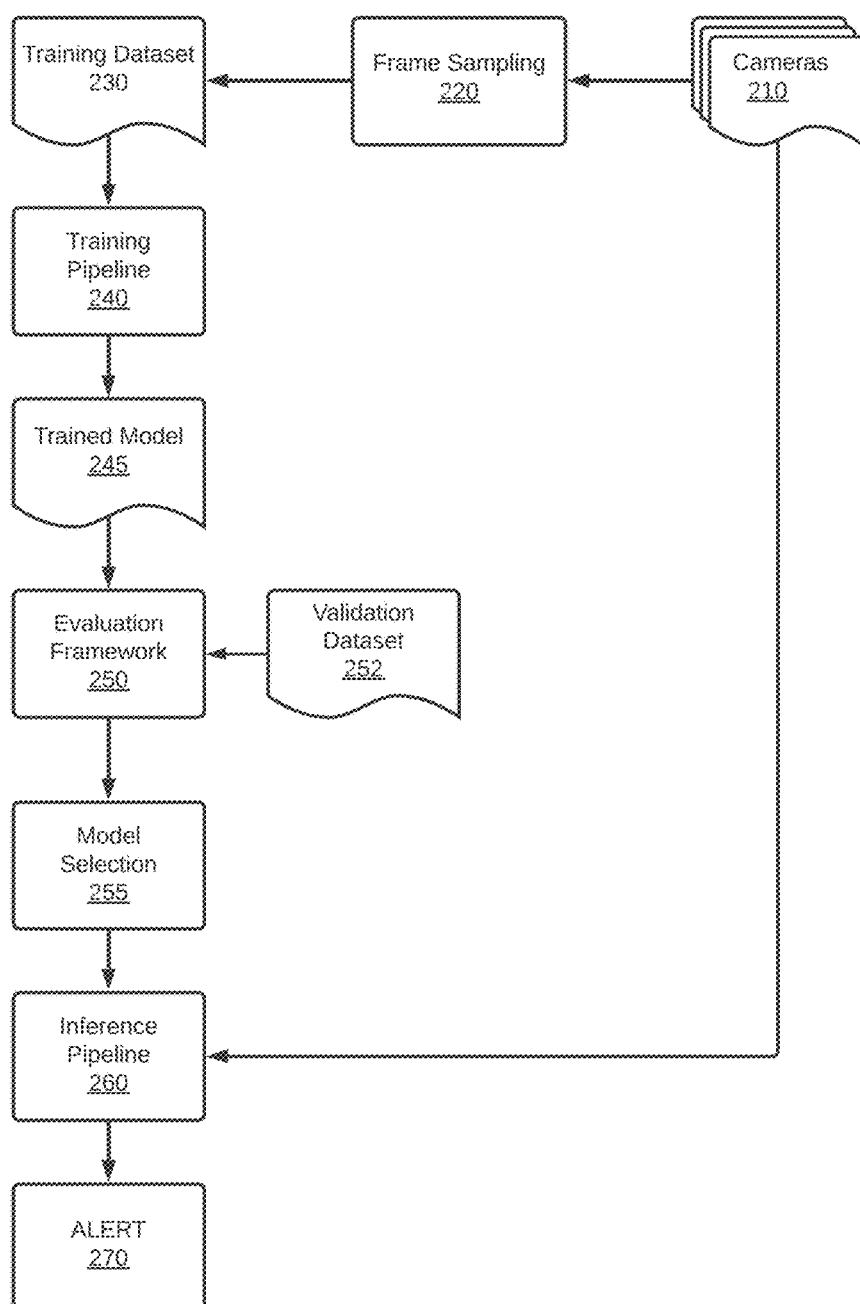
FIG. 2 is a flowchart that illustrates an overview of the continuous training and operation of the fire detection system.

FIG. 2 illustrates an overview of the continuous training and operation of the system. One or more cameras capture video stream(s) from the examined area(s) (210). Sample frames from the video stream are extracted with a specific sampling frequency (220) and stored in a repository (230). The sampled frames are visually examined and annotated by human experts and fed to a training pipeline (240). Further details of the training pipeline are described with respect to FIG. 3. The training is performed offline when a sufficient number of frames is captured by the cameras. The result from the training pipeline is an object detection model defined by a set of parameters (245). The model can detect and differentiate (classify) fire and smoke patterns in the acquired frames with specific performance as quantified through an appropriate metric. In one embodiment, the metric is the Area Under a Receiver Operating Characteristic (ROC) Curve (AUC) of True Positives Rate vs. False Positives Rate at different confidence threshold values, as described with respect to FIG. 5. The AUC metric provides an aggregate measure of the model capacity to distinguish a fire/smoke pattern from a normal (fire/smoke free) pattern. The AUC is measured in the evaluation framework (250) using a validation dataset (252) containing sample images not used at the training of the model. The model is scored in the evaluation framework based on its AUC metric, and the score is compared to any previously trained model score. The system selects the model with the highest score for the inference phase going forward (255). Further details on the evaluation framework are discussed with respect to FIG. 5.

The captured sequence of frames is also fed in substantially real time to an inference pipeline (260), which uses an already trained model (as chosen between all previously trained models according to their accuracy scores) to evaluate the frames for possible fire/smoke patterns. Alerts are generated in response to detecting fire and smoke patterns (270). Further details on the inference pipeline are described with respect to FIG. 6. The whole process is continuous: a new model is trained when a defined number of new frames is sampled (220) and stored in the data repository (230).

2. Training Pipeline

Figure 3:
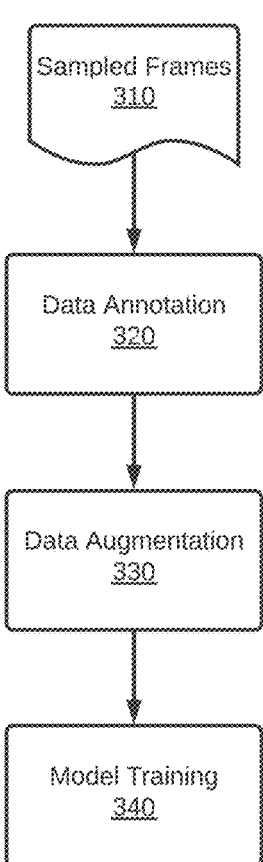
FIG. 3 is a flowchart that illustrates the training pipeline according to one embodiment.

FIG. 3 illustrates the training pipeline according to one embodiment. The input to the training pipeline is annotated data. Specifically, snapshots from forested regions are extracted by utilizing optical cameras and subsequently labeled by specialists with domain expertise (310, 320). Instances of smoke and fire, as well as entities having visual characteristics similar to smoke and fire, are labeled accordingly with bounding boxes. In response to receiving the annotated data, the system enacts a data augmentation protocol to automatically create additional annotated data for training the fire detection model (step 330). A stochastic sequence of numerical values of random magnitude is used to determine both the quantity and sequence (order) of functions employed during the augmentation process (see FIG. 4). The original annotated data and the auto-created annotated data is then used to train the fire detection model to discern instances of smoke and fire (340). In one embodiment, the fire detection model is a YOLO (You Only Look Once) model. The images in the training set are pre-processed (e.g., contrast/brightness correction and cropped) prior to being used to train the model in the same manner as the images are pre-processed in the interference phase.

3. Training Data Augmentation

Figure 4:
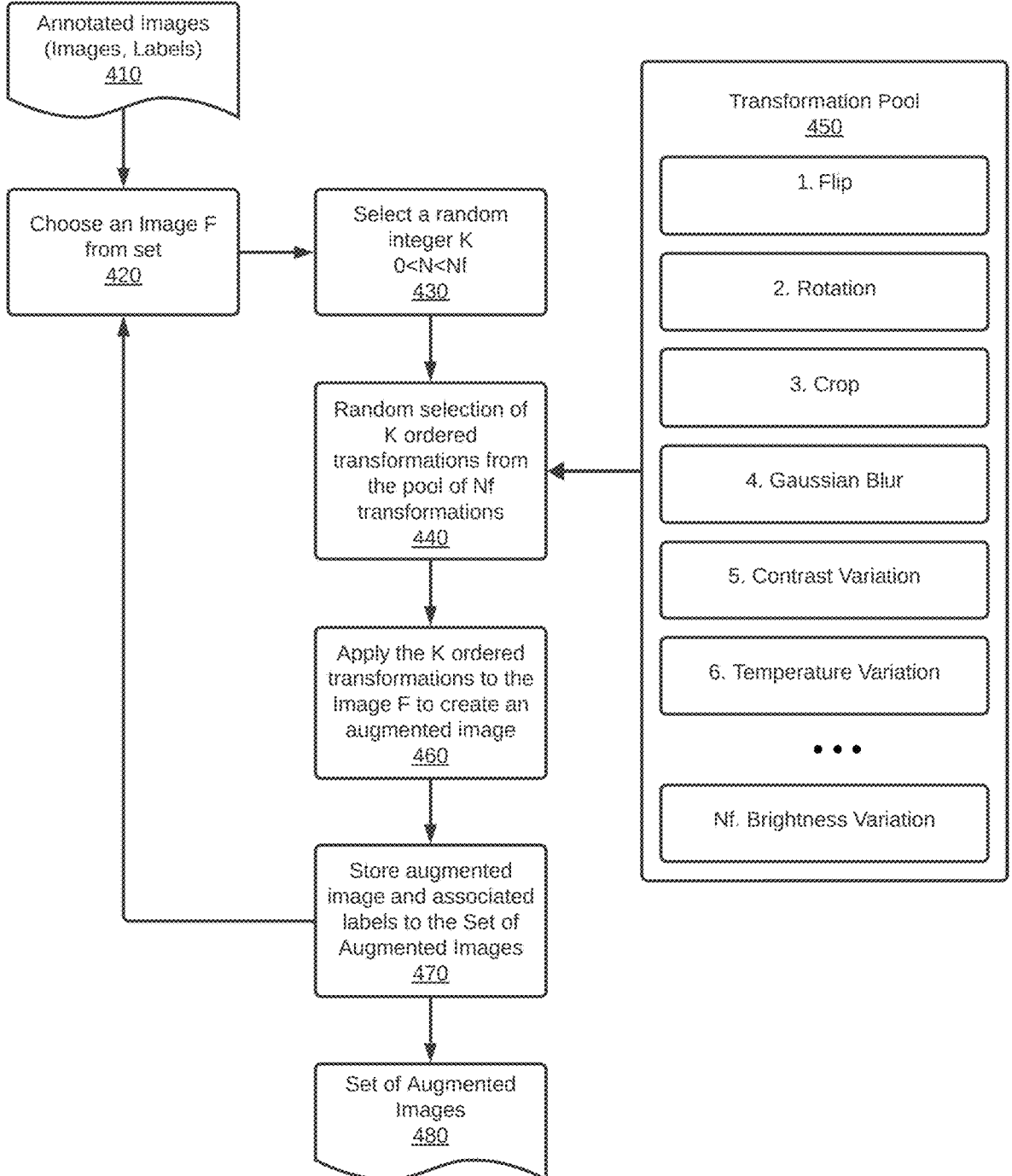
FIG. 4 is a flowchart illustrating a method in which the system auto-generates synthetic images for training from an existing set of annotated images.

The more annotated data used to train the model, the better the model gets at detecting fire and smoke. However, manually annotating data is time consuming. FIG. 4 illustrates a method in which the system auto-generates synthetic images for training from an existing set of annotated images (frames), thus increasing the pool of images used to train the model. The input to the process is a set of manually-annotated images (410). The system selects an image F from the set (420). The system generates a random integer K, where K is $0<K<N_f$ (430). $N_f$ is the number of functions in a transformation pool (450). The functions in the transformations' pool are functions that can be applied to an annotated image. In one embodiment, the transformation pool includes the following:

Flip function: Performs a transformation about the vertical axis of an image frame. If this transformation is selected from the pool, the new coordinates of the box annotation enclosing the fire/smoke pattern are calculated (i.e., a new x position is calculated).

Rotate function: Pivots the image frame and associated annotations in a clockwise direction by a stochastic angle. In the case where this transformation is used, the box annotation is also transformed (i.e., its center is rotated by the same angle) to enclose the rotated fire/smoke pattern.

Zoom function: Employs a random number to truncate the image, deriving a random central point near a smoke or fire designated box. If this transformation is selected from the pool, the new coordinates of the box annotation enclosing the fire/smoke pattern are calculated (i.e., the new x, y coordinates are calculated for the new truncated image).

Gaussian Blur: Introduces Gaussian blur within the image frame with a kernel size determined randomly.

Contrast Variation: Alters contrast within the image, where the amount of adjustment is determined by a random value confined to a specific range.

Temperature Variation: Alters temperature of the image, where the amount of adjustment is determined by a random value confined to a specific range.

Brightness Variation: Alters brightness of the image, where the amount of adjustment is determined by a random value confined to a specific range.

4. The system randomly selects K ordered transformations from the pool of $N_f$ transformations (440). The system then applies the K ordered transformations to the selected image F to obtain a new annotated image (460). The new annotated image is added to a set of augmented images for use in training the fire detection model (470). The process of FIG. 4 is repeated a plurality of times, resulting in a growing set of synthetic annotated images (i.e., system selects another image or the same image, applies a random number of transformations to the selected image, adds the new augmented image to the set of augmented images, and repeats the process for a predefined number of times).

Evaluation Framework

Figure 5:
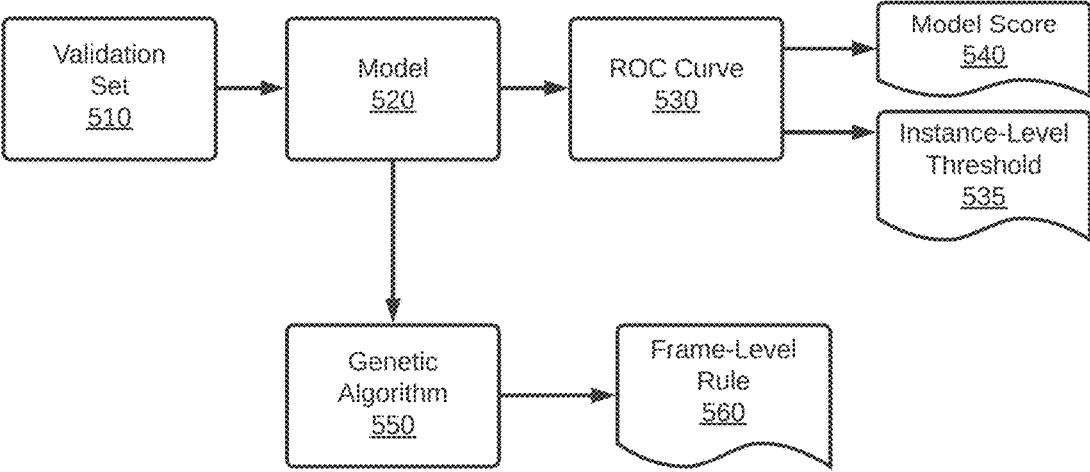
FIG. 5 is a flowchart that illustrate a method for evaluating the performance of the trained model and for extracting of the rule and thresholds for classifying frames as having "fire" or "smoke."

FIG. 5 illustrates an evaluation framework for evaluating the performance of the trained model and for extracting the rule and thresholds for classifying frames as having "fire" or "smoke." More specifically, the evaluation framework is implemented to do the following:

a. Evaluate the performance of the trained model in its capacity to adequately detect and separate images with fire and smoke patterns from images without fire and smoke patterns.

b. Calculate the instance-level threshold that defines the minimum confidence level for a detected smoke or fire pattern to be considered an instance of fire or smoke within an image.

c. Calculate a frame-level rule that defines when a frame with one or more detected instances of fire or smoke is classified as a frame having fire or smoke.

Figure 7:
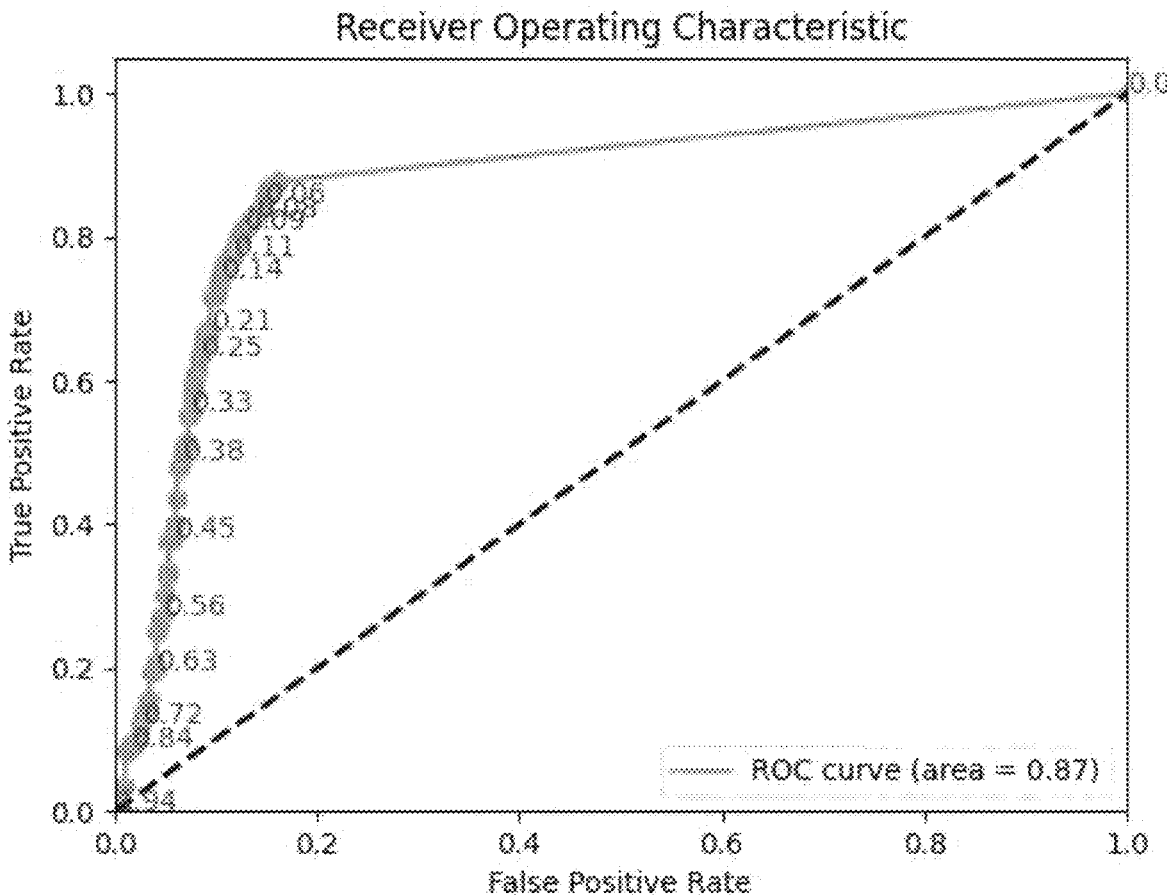
FIG. 7 is an example of an ROC curve for evaluating a trained model.

The input to the evaluation process is a validation set of annotated images that was not used for training (510). A subset of this validation set contains annotated images with visually verified fire and smoke patterns. The rest of the images are fire/smoke free. The object detection model is applied to all images in the validation set (after the images are preprocessed) (520). Detected fire and smoke patterns in set of validation images are encompassed in bounding boxes, and each bounding box is associated with a confidence score (e.g., between 0 and 1). True positives (fire and smoke correctly detected by the model) and false positives (fire and smoke incorrectly detected by the model) are identified at different confidence threshold values. The system then constructs a Receiver Operating Characteristic (ROC) curve of True Positives Rate vs. False Positives Rate at different confidence threshold values (530). The ROC curve shows the relationship between the model's correct (True Positives Rate) and mistaken smoke/fire identifications (False Positives Rate) at different confidence levels. An example of an ROC curve is illustrated in FIG. 7. A method for constructing an ROC curve is described in more detail below.

The ROC curve is used to establish the instance-level threshold (535), as described below. The Area Under the ROC Curve (AUC) is also evaluated. This area is used as a metric quantifying the model in its capacity to distinguish between images containing fire/smoke and images free of fire/smoke patterns. A higher value of the AUC value indicates a model of better performance (better separability). This value is assigned to the model as the model score (540). The system uses the model score to determine whether to replace the model currently used in the inference phase (assuming this is not the first trained model) with the newly trained model. The model with the highest model score is selected for use in the interference phase.

The set of detected boxes and associated confidence values as calculated by the object detection model for all images of the validation set is used in a genetic algorithm to ascertain the frame-level rule (550, 560). A genetic algorithm according to one embodiment is set forth below.

4.1 Constructing an ROC Curve

In one embodiment, an ROC curve is constructed according to the following method:

1. The confidence threshold is set to an initial value LT (typical initial value of LT is 0.01).

2. The rate of true positives and the rate of false positives are calculated for the specified confidence threshold:

a. All images positively annotated (images having fire/smoke patterns) and correctly classified as positives for the defined confidence threshold (images having at least one box of confidence score higher than the defined threshold LT) are enumerated. This number is the number of True Positives (TP). The True Positive Rate (TPR) is the number of detected True Positives divided by the total number of detected positives. The total number of detected positives is the number of images classified as including fire or smoke by the object detection model, whether correctly or incorrectly.

b. All images negatively annotated (NOT having fire/smoke patterns) and falsely classified as positives for the defined confidence threshold (images having at least one box of confidence score higher than the defined confidence threshold LT) are enumerated. This number is the number of False Positives (FP). The False Positive Rate (FPR) is the number of False Positives divided by the total number of detected positives.

3. The TPR and FPR values for the defined confidence threshold LT are plotted on a Cartesian coordinate graph, where the FPR values are on the x axis and the TPR values are on the y axis.

4. The confidence threshold is increased by an incremental step $LT=LT^{prev}+DLT$, where DLT=small constant (a typical value of DLT is 0.01).

5. The new TPR and FPR values are calculated and graphed for the new threshold (step 2)

6. The procedure terminates when the value of LT exceeds the value of 0.99.

4.2 Computing an Instance-Level Threshold

In one embodiment, the instance level detection threshold is calculated from the ROC plot by finding the point at the ROC curve lying at the maximum Euclidean distance from the point (FPR=1, TPR=0).

4.3 Example Frame-Level Rule

In one embodiment, the parameters defining the frame-level rule are three integer numbers of detected boxes BOX1, BOX2, BOX3 with BOX1<BOX2<BOX3 and the associated thresholds in cumulative sums of confidence scores CONF1, CONF2, CONF3. BOX1, BOX2, and BOX3 are positive integers with BOX1<BOX2<BOX3.

In such embodiment, the frame-level rule is defined as follows: Let num_boxes=the number of bounding boxes encompassing smoke or fire that satisfy the instance-level confidence threshold in a frame.

Let conf_sum=the sum of the confidence scores for the bounding boxes encompassing smoke or fire that satisfy the instance-level confidence threshold in a frame.

In this embodiment, a frame satisfies the frame-level rule if one of the following conditions is met:

1. If the (num_boxes is equal to the integer BOX1 and the conf_sum is greater than the confidence threshold CONF1)

OR

2. If the (num_boxes is greater than the integer BOX2 and the conf_sum is greater than the confidence threshold CONF2)

OR

3. If the (num_boxes is greater than the integer BOX3 and the conf_sum is greater than the confidence threshold CONF3)

4.4 Genetic Algorithm for Ascertaining Parameters of the Frame-Level Rule

In one embodiment, the parameters BOX1, BOX2, BOX3, CONF1, CONF2, CONF3 defining the frame-level rule are computed by a genetic algorithm using the validation set of annotated images. The input and output of genetic algorithm is as follows:

Input:

1. Confidence Scores and number of detected boxes of each image after applying the trained object detection model to all images in the validation set containing M images.

2. Multi-Objective Function: [min (FPR), max (TPR)].

Output:

1. Optimum parameters values of BOX1, BOX2, BOX3, CONF1, CONF2, CONF3 for defining the frame-level rule.

Figure 8:
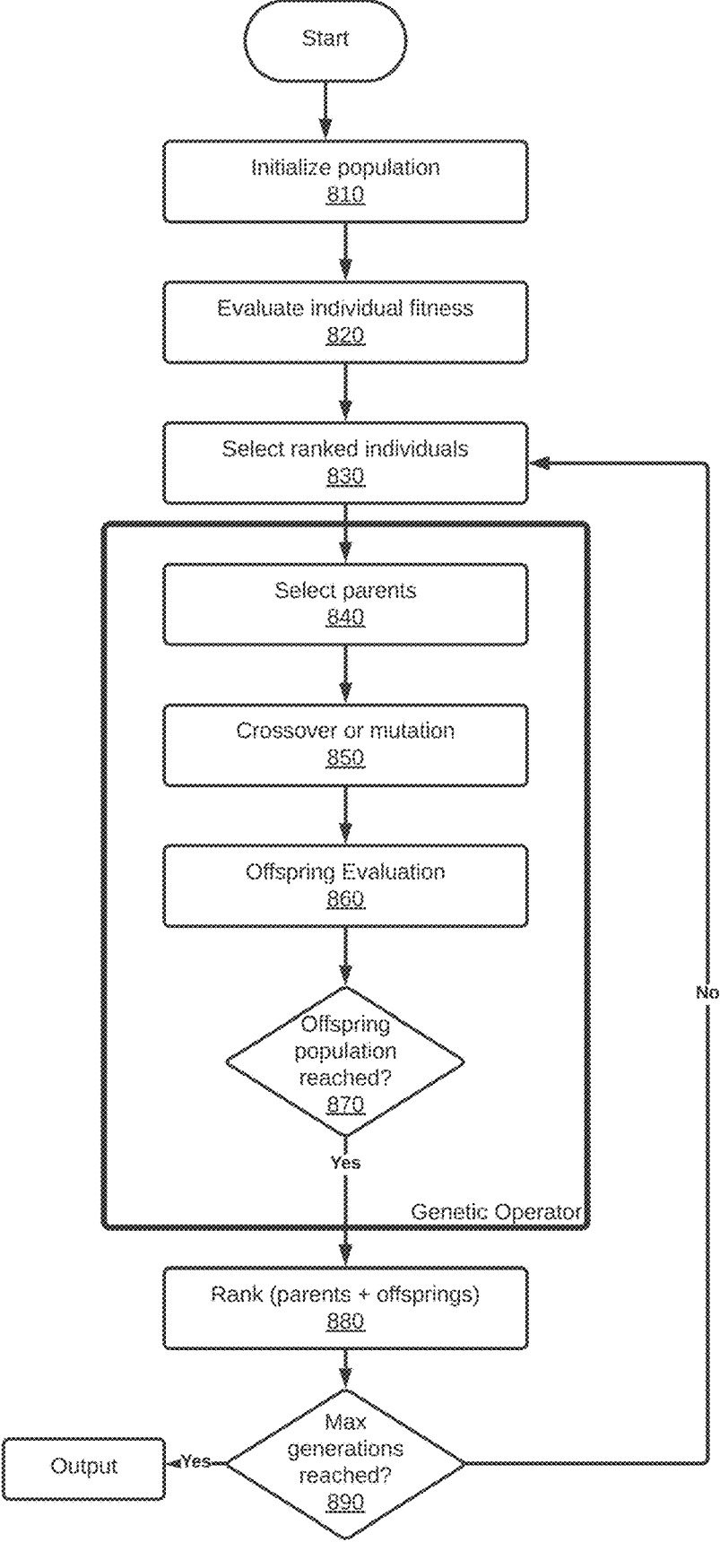
FIG. 8 is a flowchart that illustrates a genetic algorithm according to one embodiment.

FIG. 8 illustrates the genetic algorithm according to one embodiment. Each of the illustrated steps is described in more detail below:

Step 810: Initialize Population of Solutions.

A set of N parameters' [BOX1, BOX2, BOX3, CONF1, CONF2, CONF3] combinations is randomly sampled within a predefined range (810). Each parameters' combination is a possible solution for defining the frame-level rule.

Step 820: Evaluate Individual Fitness.

For each sample combination BOX1, BOX2, BOX3, CONF1, CONF2, CONF3, the frame-level rule is defined as described in Section 4.3 above. The frame-level rule is applied to the confidence scores and number of detected boxes of each image in the validation set. The True Positive Rate (TPR) and False Positive Rate (FPR) are calculated and assigned to the combination BOX1, BOX2, BOX3, CONF1, CONF2, CONF3. After this step, a set of N solutions each one assigned to a TPR value and a FPR value is generated.

Step 830: Select Ranked Individuals.

The individual solutions are ranked according to their dominance class. The dominance classes are defined as follows:

The first dominance class, class 1, contains all solutions for which there is NOT any other solution in the generated set having HIGHER True Positive Rate (TPR) AND LOWER False Positive Rate (FPR) value.

Dominance class 2 contains all solutions which are only dominated by class 1 solutions or equivalently, there is at least one solution from class 1 which is assigned to a HIGHER TPR AND LOWER FPR value.

Similarly, the dominance class 3 contains all solutions dominated by at least one solution from class 2, or equivalently, there is at least one solution from class 2 which is assigned to a HIGHER TPR AND LOWER FPR value.

In addition to the dominance class, each solution is assigned a sparsity value which is calculated by:

$$Sp = \sum_{i=1}^{2} \frac{f_i^{next} - f_i^{prev}}{f_i^{max} - f_i^{min}}$$

where $$f_i^{next}$$

and $$f_i^{prev}$$

are the objective function values of the neighboring solutions in the ith objective (TPR and FPR), $$f_i^{max}$$

and $$f_i^{min}$$

are the maximum and minimum objective function values in the population for the ith objective, and the summation is taken over all objective functions.

After assigning a dominance class and a sparsity value to each solution, the algorithm proceeds by selecting Np solutions from the initial set of N solutions. The selection is performed as follows:

Sort the solution according to their dominance class (Solutions from dominance class 1 will be presented at the top of the list). As a second criterion use their sparsity value (when multiple solutions belong to the same dominance class, the ones having larger sparsity value will be presented at the top of the sub list).

Select the top Np solutions from the sorted list of solutions.

Step 840: Select Parents.

Random selection of Np/2 pairs of parents from the set of Np solutions.

Step 850: Crossover or Mutation

For each pair (parents) of solutions apply a single point crossover operation with probability p_cross and a mutation operation with probability p_mut.

The generated solutions after applying the two operators to all pairs of parents compose a new set (generation) of solutions, the offspring.

Step 860: Offspring Evaluation

Calculate the objective function (TPR and FPR values, 0.0<TPR<1.0, 0.0<FPR<1.0) for the generated solution after the crossover and mutation operations.

Step 870: Rank Parents and Offspring

Update the set of solutions with the generated solutions from step 860. Iterate from step 830: Rank and select the new Np subset of solutions as described in step 830.

Terminate when the number of generations exceeds a predefined integer number. Select the optimum solution from the final generation. This is the one defined by the objectives TPR$^{opt}$ and FPR$^{opt}$ whose values lie at the maximum Euclidean distance from the point (TPR=0, FPR=1):

$$\max(Dist) \text{ where } Dist^2 = (TPR - 0)^2 + (FPR - 1)^2$$

5. Interference Pipeline

Figure 6:
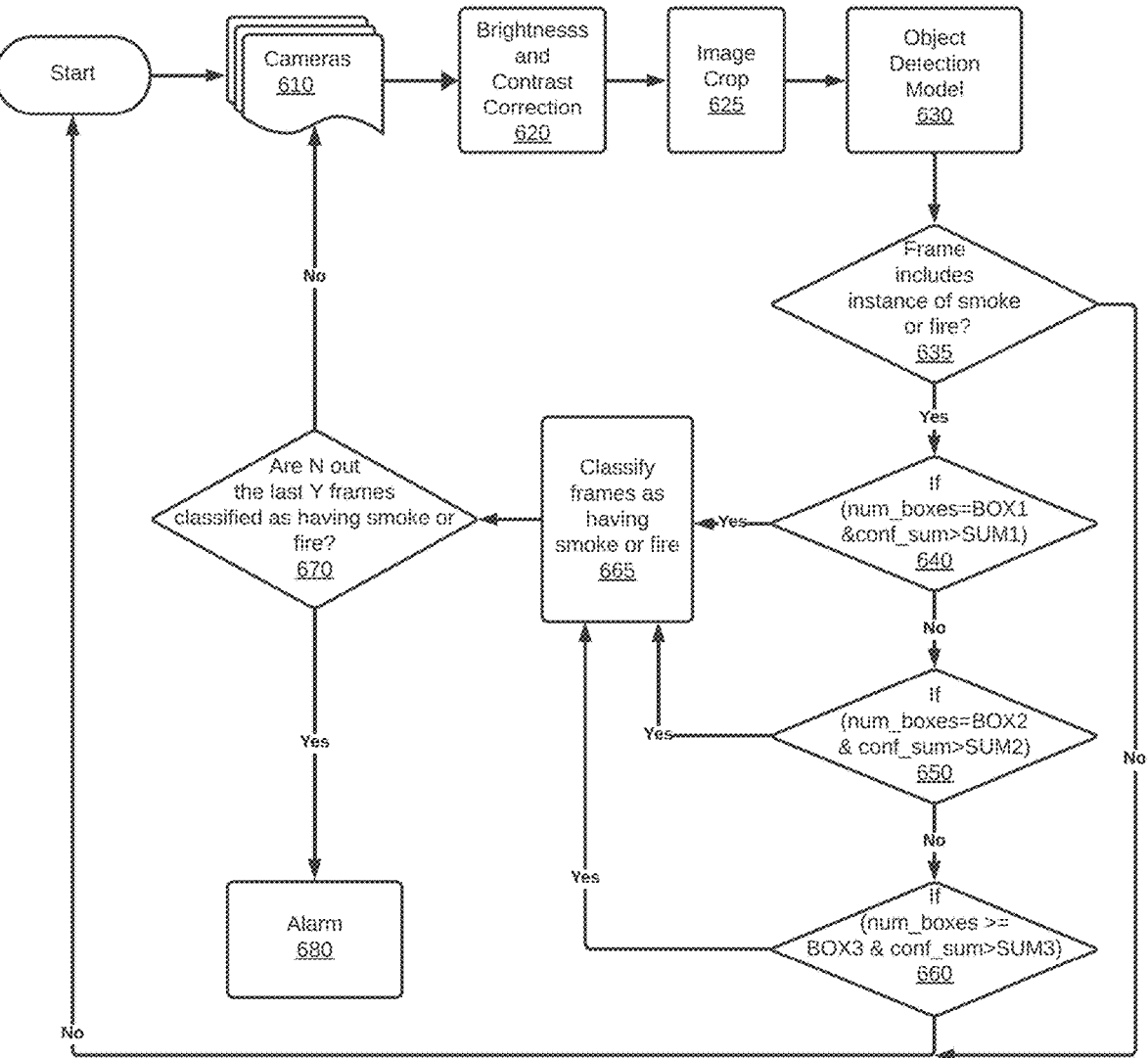
FIG. 6 is a flowchart that illustrates the inference pipeline according to one embodiment.

FIG. 6 illustrates the inference pipeline. The input of the inference pipeline are sequential frames (images) from the camera streams (610). The inference pipeline commences with the system applying brightness and contrast correction to each frame (image) (620). The system then crops each image frame into four distinct regions (625). Cropping frame into four smaller segments enhances the precision of the detection process as it eliminates the need for significant image compression. In this approach the model will be applied on multiple segments of the same image and not on one down-sampled image (down-sampling is required for feeding an image to the model having a defined constant input size). Subsequently, the object detection model, which has been trained to recognize smoke and fire patterns, analyzes each of the subframes for smoke and fire patterns (630). Any detected fire and smoke patterns are encompassed within bounding boxes and associated with a confidence score. For each bounding box, the system applies the instance-level threshold to the box, where bounding boxes with confidence scores higher than the threshold are deemed to be instances of fire or smoke (step 635).

For each frame having at least one instance of fire or smoke, the system determines whether a frame should be classified as having fire or smoke by determining whether the number of identified smoke or fire instances in its subframes and the associated confidence scores satisfy a frame-level detection rule (640-660). As described above, frame-level rule delineates the conditions under which a frame that includes one or more instances of smoke or fire is classified having smoke or fire, with such conditions factoring in both a cumulative count of fire or smoke instances within each frame and their respective cumulative confidence scores. If the frame satisfies the frame-detection rule, then the frame is classified as having fire or smoke (665).

If N out of the last X frames are classified as having fire or smoke, an alarm is triggered (670, 680). In one embodiment, typical values of N, X are 10 and 20 respectively. Specifically, an alert message is generated and transmitted (e.g., text message, email, etc.) to a team of fire management personnel.

6.0 General

The methods described with respect to FIGS. 1-9 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions. A person skilled in the art would also understand that a computer system may be a stand-alone computer or a network of computers working together, such as in a client-server architecture.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for automatically detecting fire and smoke events in video frames, the method comprising:

training an object detection model on a training data set of video frames to identify fire and smoke patterns in said frames, wherein said model is configured to output bounding boxes around detected fire and smoke patterns within the frames, each bounding box accompanied by a confidence score, wherein the object detection model is also trained to identify a third class of image patterns that exhibit similarities to fire and smoke patterns in terms of color, shape, and texture;

after said training, determining an instance-level detection threshold using the trained object detection model and a validation set of annotated video frames, the threshold defining a minimum confidence score requisite for a bounding box around a smoke or fire pattern to be deemed an instance of fire or smoke within a frame;

after said training, establishing a frame-level detection rule utilizing the trained object detection model and the validation set of annotated video frames, wherein said rule delineates the conditions under which a frame that includes one or more instances of smoke or fire is classified as a smoke or fire event, with such conditions factoring in both a cumulative count of fire or smoke instances within each frame and their respective cumulative confidence scores; and during an inference phase, performing the following:

inputting a stream of video frames into the trained object detection model, the model outputting bounding boxes around any detected fire and smoke patterns within the frames, each bounding box accompanied by a confidence score;

for each bounding box around a fire or smoke pattern outputted by the model, determining if the bounding box represents an instance of fire and smoke using the confidence score associated with bounding box and the instance-level detection threshold;

for each frame having an instance of fire or smoke, assessing the frame for a fire or smoke event by applying the frame-level rule to the frame, wherein a frame satisfying the frame-level rule is classified as a frame having smoke or fire; and triggering an alarm in response to a sequence of frames classified as having fire or smoke satisfying an alarm threshold.

2. The method of claim 1, wherein, during the inference phase, each frame in the input video stream is subdivided into subframes before being inputted into the object detection model.

3. The method of claim 1, wherein the validation set used in determining the instance-level threshold and the frame-level rule is distinct from the training data set.

4. The method of claim 1, wherein an alarm is triggered in response to N out of the last X frames being classified as having fire or smoke.

5. The method of claim 1, wherein triggering an alarm comprises transmitting a message to one or more entities notifying the entities of a potential fire event.

6. A system for automatically detecting fire and smoke events in video frames, the system comprising:

one or more processors;

one or more memory units coupled to the one or more processors, wherein the one or more memory units store instructions that, when executed by the one or more processors, cause the system to perform the operations of:

training an object detection model on a training data set of video frames to identify fire and smoke patterns in said frames, wherein said model is configured to output bounding boxes around detected fire and smoke patterns within the frames, each bounding box accompanied by a confidence score, wherein the object detection model is also trained to identify a third class of image patterns that exhibit similarities to fire and smoke patterns in terms of color, shape, and texture;

after said training, determining an instance-level detection threshold using the trained object detection model and a validation set of annotated video frames, the threshold defining a minimum confidence score requisite for a bounding box around a smoke or fire pattern to be deemed an instance of fire or smoke within a frame;

after said training, establishing a frame-level detection rule utilizing the trained object detection model and the validation set of annotated video frames, wherein said rule delineates the conditions under which a frame that includes one or more instances of smoke or fire is classified as a smoke or fire event, with such conditions factoring in both a cumulative count of fire or smoke instances within each frame and their respective cumulative confidence scores; and during an inference phase, performing the following:

inputting a stream of video frames into the trained object detection model, the model outputting bounding boxes around any detected fire and smoke patterns within the frames, each bounding box accompanied by a confidence score;

for each bounding box around a fire or smoke pattern outputted by the model, determining if the bounding box represents an instance of fire and smoke using the confidence score associated with bounding box and the instance-level detection threshold;

for each frame having an instance of fire or smoke, assessing the frame for a fire or smoke event by applying the frame-level rule to the frame, wherein a frame satisfying the frame-level rule is classified as a frame having smoke or fire; and triggering an alarm in response to a sequence of frames classified as having fire or smoke satisfying an alarm threshold.

7. The system of claim 6, wherein, during the inference phase, each frame in the input video stream is subdivided into subframes before being inputted into the object detection model.

8. The system of claim 6, wherein the validation set used in determining the instance-level threshold and the frame-level rule is distinct from the training data set.

9. The system of claim 6, wherein an alarm is triggered in response to N out of the last X frames being classified as having fire or smoke.

10. The system of claim 6, wherein triggering an alarm comprises transmitting a message to one or more entities notifying the entities of a potential fire event.

11. A non-transitory computer-readable medium comprising a computer program, that, when executed by a computer system, enables the computer system to perform the following method for automatically detecting fire and smoke events in video frames:

training an object detection model on a training data set of video frames to identify fire and smoke patterns in said frames, wherein said model is configured to output bounding boxes around detected fire and smoke patterns within the frames, each bounding box accompanied by a confidence score, wherein the object detection model is also trained to identify a third class of image patterns that exhibit similarities to fire and smoke patterns in terms of color, shape, and texture;

after said training, determining an instance-level detection threshold using the trained object detection model and a validation set of annotated video frames, the threshold defining a minimum confidence score requisite for a bounding box around a smoke or fire pattern to be deemed an instance of fire or smoke within a frame;

after said training, establishing a frame-level detection rule utilizing the trained object detection model and the validation set of annotated video frames, wherein said rule delineates the conditions under which a frame that includes one or more instances of smoke or fire is classified as a smoke or fire event, with such conditions factoring in both a cumulative count of fire or smoke instances within each frame and their respective cumulative confidence scores; and during an inference phase, performing the following:

inputting a stream of video frames into the trained object detection model, the model outputting bounding boxes around any detected fire and smoke patterns within the frames, each bounding box accompanied by a confidence score;

for each bounding box around a fire or smoke pattern outputted by the model, determining if the bounding box represents an instance of fire and smoke using the confidence score associated with bounding box and the instance-level detection threshold;

for each frame having an instance of fire or smoke, assessing the frame for a fire or smoke event by applying the frame-level rule to the frame, wherein a frame satisfying the frame-level rule is classified as a frame having smoke or fire; and triggering an alarm in response to a sequence of frames classified as having fire or smoke satisfying an alarm threshold.

12. The non-transitory computer-readable medium of claim 11, wherein, during the inference phase, each frame in the input video stream is subdivided into subframes before being inputted into the object detection model.

13. The non-transitory computer-readable medium of claim 11, wherein the validation set used in determining the instance-level threshold and the frame-level rule is distinct from the training data set.

14. The non-transitory computer-readable medium of claim 11, wherein an alarm is triggered in response to N out of the last X frames being classified as having fire or smoke.

15. The non-transitory computer-readable medium of claim 11, wherein triggering an alarm comprises transmitting a message to one or more entities notifying the entities of a potential fire event.

* * * * *